United States Patent
Jin et al.

(10) Patent No.: US 9,214,868 B2
(45) Date of Patent: Dec. 15, 2015

(54) POWER SUPPLY DEVICE

(71) Applicants: LG INNOTEK CO., LTD., Seoul (KR); INDUSTRY FOUNDATION OF CHONNAM NATIONAL UNIVERSITY, Gwangju (KR)

(72) Inventors: Chunfeng Jin, Seoul (KR); Sung Jun Park, Seoul (KR); Woo Seok Choi, Seoul (KR)

(73) Assignees: LG INNOTEK CO., LTD., Seoul (KR); Industry Foundation of Chonnam National University, Gwangju (KR)

( * ) Notice: Subject to any disclaimer, the term of this patent is extended or adjusted under 35 U.S.C. 154(b) by 0 days.

(21) Appl. No.: 14/019,122

(22) Filed: Sep. 5, 2013

(65) Prior Publication Data

US 2014/0063859 A1     Mar. 6, 2014

(30) Foreign Application Priority Data

Sep. 6, 2012 (KR) .................. 10-2012-0098787

(51) Int. Cl.
*H02M 3/335* (2006.01)
*H02M 1/00* (2007.01)

(52) U.S. Cl.
CPC ...... *H02M 3/33576* (2013.01); *H02M 3/33592* (2013.01); *H02M 2001/0048* (2013.01); *Y02B 70/1433* (2013.01); *Y02B 70/1475* (2013.01); *Y02B 70/1491* (2013.01)

(58) Field of Classification Search
USPC ............. 363/17, 15, 16, 21.02, 21.03, 40, 41, 363/95, 98
See application file for complete search history.

(56) References Cited

U.S. PATENT DOCUMENTS

| 4,860,184 | A | 8/1989 | Tabisz et al. | |
| 6,538,905 | B2 * | 3/2003 | Greenfeld et al. | 363/17 |

(Continued)

FOREIGN PATENT DOCUMENTS

| CN | 101036284 A | 9/2007 |
| EP | 1267476 A2 | 12/2002 |

(Continued)

OTHER PUBLICATIONS

Choi, M.S. et al. "High Efficiency Boost Bidirectional DC/DC Converter for EV", Korea Electronics Technology Institute, Chonnam National University, 2010, 2010(7):31-32.

(Continued)

*Primary Examiner* — Emily P Pham
(74) *Attorney, Agent, or Firm* — Saliwanchik, Lloyd & Eisenschenk

(57) ABSTRACT

A power supply device is provided. The power supply device includes: a transformer configured to include first and second windings; a half bridge circuit configured to be connected to first and second nodes and both ends of the first wiring; and a full bridge circuit configured to be connected to third and fourth nodes and both ends of the second winding. Since the leakage inductance of the transformer and the bridge capacitor of the half bridge circuit form a direct current (DC) resonant tank, switching loss that may occur during the turning on or off of switches can be reduced.

9 Claims, 3 Drawing Sheets

(56) References Cited

U.S. PATENT DOCUMENTS

| | | |
|---|---|---|
| 7,796,406 B2 * | 9/2010 | Lev .......................... 363/21.02 |
| 2002/0191420 A1 | 12/2002 | Tolle et al. |
| 2008/0084167 A1 | 4/2008 | Waffenschmidt et al. |
| 2009/0244933 A1 | 10/2009 | Wang et al. |
| 2012/0147629 A1 * | 6/2012 | Mao et al. ...................... 363/17 |
| 2013/0208512 A1 | 8/2013 | Rojas et al. |

FOREIGN PATENT DOCUMENTS

| | | |
|---|---|---|
| JP | 05-091740 A | 4/1993 |
| JP | 09-047022 A | 2/1997 |
| JP | 2009-136137 A | 6/2009 |
| WO | WO-2012/055862 A2 | 5/2012 |

OTHER PUBLICATIONS

Office Action dated Aug. 16, 2013 in Korean Application No. 10-2012-0098787, filed Sep. 6, 2012.

Office Action dated Jul. 22, 2014 in Japanese Application No. 2013-184012.

Office Action dated Jul. 2, 2015 in Chinese Application No. 201310403472.7.

* cited by examiner

POWER SUPPLY DEVICE

CROSS-REFERENCE TO RELATED APPLICATION

This application claims the benefit under 35 U.S.C. §119 of Korean Patent Application No. 10-2012-0098787, filed Sep. 6, 2012, which is hereby incorporated by reference in its entirety.

BACKGROUND

1. Field of the Invention

Embodiments relate to a power supply device.

2. Description of the Related Art

Power supply devices include converters, such as alternating current (AC)-to-direct current (DC) or DC-to-AC converters.

DC-to-DC converters convert a DC input into a DC output and operate in a load mode or a power mode depending on an input-to-output ratio.

A DC-to-DC converter includes a transformer and also includes a full bridge circuit as a rectifier.

However, during the switching operation of the full bridge circuit (particularly, during a zero-voltage switching operation), noise may be generated, and the magnitude and cycle of noise may become irregular due to deviations in transmission delays between the elements of the full bridge circuit. To inhibit these problems, a snubber condenser may be added to a driving switch of the full bridge circuit, which, however, incurs additional cost and may lead to decreases in effective transmission time and efficiency.

BRIEF SUMMARY

Embodiments provide a power supply device capable of reducing switching loss during the turning on or off of a switch.

In one embodiment, a power supply device includes: a transformer configured to include first and second windings; a half bridge circuit configured to be connected to first and second nodes and both ends of the first wiring; and a full bridge circuit configured to be connected to third and fourth nodes and both ends of the second winding.

The half bridge circuit may be further configured to include first and second switches connected in series between the first and second nodes and first and second capacitors connected in series between the first and second nodes.

The full bridge circuit may be further configured to include third and fourth switches connected in series between the third and fourth nodes and fifth and sixth switches capacitors connected in series between the third and fourth nodes.

The first winding may be connected between the first and second switches and between the first and second capacitors.

The second winding may be connected between the third and fourth switches and between the fifth and sixth switches.

The first to sixth switches may be transistors.

Each of the first to sixth switches may include a diode.

The first and second switches may be alternately driven.

The first and second switches may be driven at a duty cycle of ½.

A switching frequency for the first and second switches may be the same as a leakage inductance of the transformer and a resonant frequency of the first and second capacitors.

The first and second capacitors may have the same capacitance.

The power supply device may also include a controller configured to drive the first to sixth switches.

The third to sixth switches may be turned off when the first and second switches are alternately being driven.

The first and second switches may be turned off when the third to sixth switches are alternately being driven.

The diodes of the first to sixth switches may be connected to each other in a backward direction.

The power supply device may also include: a first output capacitor configured to be disposed between the first and second nodes; and a second output capacitor configured to be disposed between the third and fourth nodes.

According to embodiments, SINCE the leakage inductance of the transformer and the bridge capacitor of the half bridge circuit form a direct current (DC) resonant tank, switching loss that may occur during the turning on or off of switches can be reduced. As a result, power conversion efficiency can be improved, and noise can be reduced.

DETAILED DESCRIPTION

Reference will now be made in detail to embodiments, examples of which are illustrated in the accompanying drawings. However, the present disclosure may be embodied in many different forms and should not be construed as limited to the embodiments set forth herein. Rather, these embodiments are provided so that this disclosure will be thorough and complete, and will fully convey the scope of the disclosure to those skilled in the art. The present disclosure is defined only by the subject matters of the claims.

The terminology used in the present disclosure is for the purpose of describing particular embodiments only and is not intended to limit the disclosure. As used in the disclosure and the appended claims, the singular forms "a", "an" and "the" are intended to include the plural forms as well, unless context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
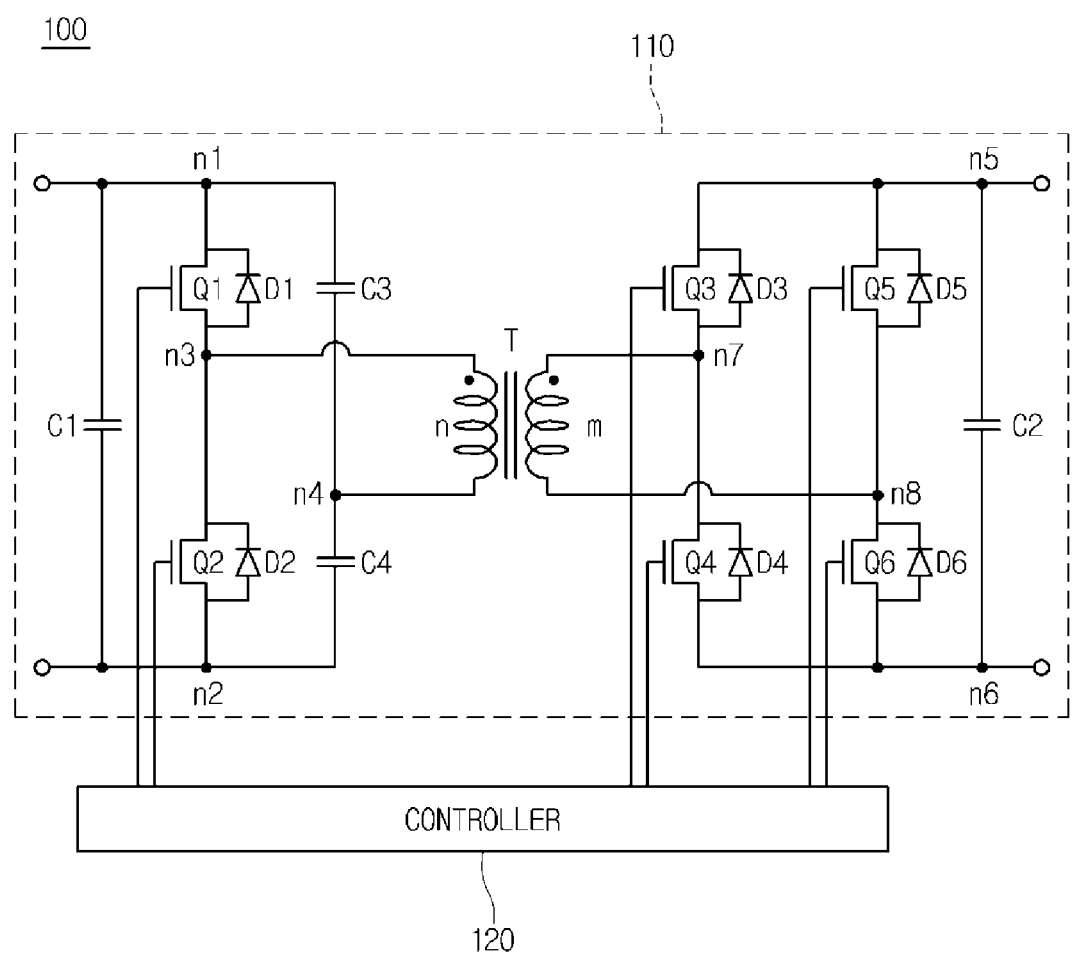
FIG. 1 is a circuit diagram of a power supply device according to an embodiment.

FIG. 1 is a circuit diagram of a power supply device 100 according to an embodiment.

Referring to FIG. 1, the power supply device 100 includes a DC-to-DC converter 110 and a controller 120.

The DC-to-DC converter 110 includes a first circuit unit disposed on the left side of a transformer T and a second circuit unit disposed on the right side of the transformer T.

The first circuit unit includes a first capacitor C1 formed between first and second nodes n1 and n2. First and second switches Q1 and Q2 are connected in series between the first and second nodes n1 and n2.

Third and fourth capacitors C3 and C4 are connected in series between the first node n1 and the second node n2.

A first winding connects the third node n3 between the first and second switches Q1 and Q2 and the fourth node n4 between the third and fourth capacitors C3 and C4. The first winding is included in the transformer T.

The first and second switches Q1 and Q2 and the third and fourth capacitors C3 and C4 form a half bridge between the first to fourth nodes N1 to N4.

The first and second switches Q1 and Q2 may be transistors. A first diode D1 is formed between the source and drain of the first switch Q1, and a second diode D2 is formed between the source and drain of the second switch Q2.

That is, the first diode D1 is formed between the first and third nodes n1 and n3 in a backward direction, and the second diode D2 is formed between the third and second nodes n3 and n2 in the backward direction.

The second circuit unit includes a second capacitor C2 formed between fifth and sixth nodes n5 and n6.

Third to sixth switches Q3 to Q6 are formed between the fifth and sixth nodes n5 and n6. The third to sixth switches Q3 to Q6 form a full bridge.

More specifically, the third switch Q3 is connected between the fifth node n5 and a seventh node n7, the fourth switch Q4 is connected between the seventh node n7 and the sixth node n6, the fifth switch Q5 is connected between the fifth node n5 and an eighth node n8, and the sixth switch Q6 is connected between the eighth node n8 and the sixth node n6.

A second winding that forms the transformer T is formed between and connects the seventh and eighth nodes n7 and n8.

The third to sixth switches Q3 to Q6 may be transistors. Third, fourth, fifth and sixth diodes D3, D4, D5 and D6 are formed to connect the sources and drains of the third, fourth, fifth and sixth switches Q3, Q4, Q5 and Q6, respectively.

More specifically, the third diode D3 is formed between the fifth and seventh nodes n5 and n7 in the backward direction, the fourth diode D4 is formed between the seventh and sixth nodes n7 and n6 in the backward direction, the fifth diode D5 is formed between the fifth and eighth nodes n5 and n8 in the backward direction, and the sixth diode D6 is formed between the eighth and sixth nodes n8 and n6 in the backward direction.

The first and second windings of the transformer T may be formed to have a turns ratio of n:m.

The first and second switches Q1 and Q2 may be turned on or off due to leakage inductance generated by the transformer T and the resonant frequency of the third and fourth capacitors C3 and C4, which are bridge capacitors of the first circuit unit, thereby inducing the circuitry to resonate. In this manner, it is possible to reduce any current loss that may be generated by turning on or off the first and second switches Q1 and Q2.

The third and fourth capacitors C3 and C4 may have the same capacitance.

The power supply device 100 may include the controller 120, which outputs a control signal for controlling the first to sixth switches Q1 to Q6 of the DC-to-DC converter 110.

The controller 120 may operate in a load mode or a power mode by controlling the output of the first or second circuit unit in accordance with the operating mode of the power supply device 100.

The operation of the power supply device 100 will hereinafter be described with reference to FIGS. 2 and 3.

Figure 2:
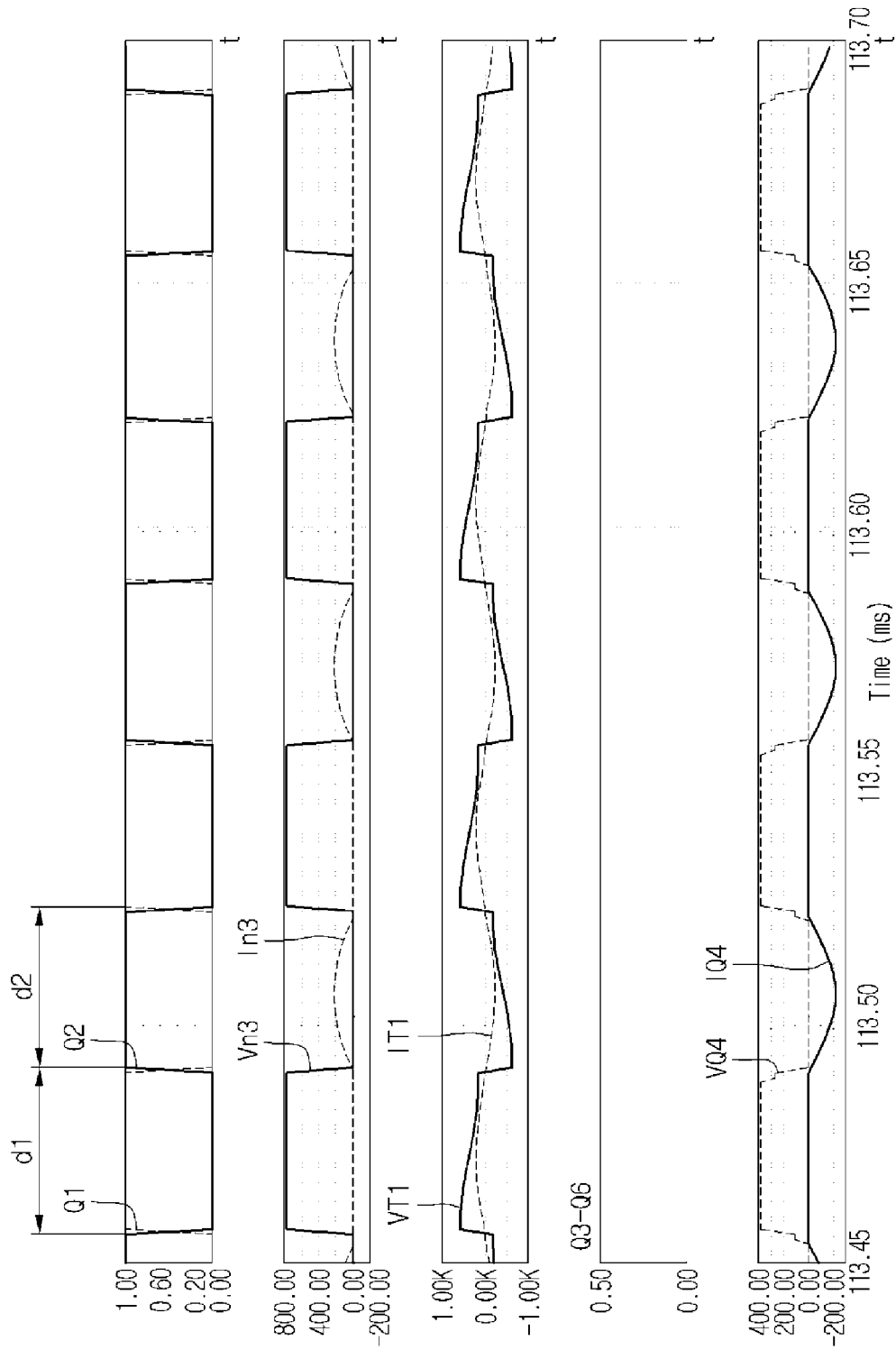
FIG. 2 is a waveform diagram illustrating an operation of the power supply device in a load mode.

FIG. 2 is a waveform diagram illustrating an operation of the DC-to-DC converter 110 in a load mode.

The transformer T may have a fixed turns ratio of n:m, and the second winding may have fewer turns than the first winding.

Referring to FIG. 2, in response to an input DC voltage being applied between the first and second nodes n1 and n2 of the first circuit unit, the second circuit unit outputs a lower voltage than the input DC voltage due to the turns ratio (i.e., n:m) of the transformer T, and as a result, the DC-to-DC converter 110 operates in a load mode.

More specifically, the controller 120 alternately turns on or off the first and second switches Q1 and Q2.

That is, the controller 120 turns on the first switch Q1 and turns off the second switch Q2 during a first period d1, and turns on the second switch Q2 and turns off the first switch Q1 during a second period d2.

The first and second periods d1 and d2 may have the same duty cycle of ½.

The switching frequency for the first and second switches Q1 and Q2 may be the same as the resonant frequency of the first and second capacitors C1 and C2.

The controller 120 turns off the third to sixth switches Q3 to Q6 that form the bridge circuit of the second circuit unit.

During the load mode, when the first switch Q1 is turned on and the second switch Q2 is turned off, the input DC voltage, which is applied between the first and second nodes n1 and n2, is applied to the third node n3 via the first switch Q1. Accordingly, the fourth capacitor C4 is charged with the input DC voltage, and thus, the voltage and current at the third node n3 become as illustrated in FIG. 2. As a result, an induction current may be induced by the transformer, as illustrated in FIG. 2.

Due to the induction current, which is generated by the turns ratio of the transformer T, a voltage is applied between the seventh and eighth nodes n7 and n8, and the induction current is transmitted to the fifth node n5 via the third diode D3.

Accordingly, the current at the fourth switch Q4 has a value of 0, but the voltage at the fourth switch Q4 is the same as the voltage at the seventh node n7.

During the second period d2, in response to the first switch Q1 being turned off and the second switch Q2 being turned on, the third node n3 is grounded, and the third capacitor C3 is charged with the input DC voltage. As a result, the voltage at the third node n3 has a value of 0, and the voltage at the fourth node n4 has the same level as the voltage at the third node n3 during the first period d1.

Accordingly, a resonant current that flows through the first winding has a sine wave, and a resonant voltage at the first winding (OK?) alternately becomes positive or negative every half a cycle.

Since the third to sixth switches Q3 to Q6 of the second circuit unit are turned off and a current flows in the backward direction, the fourth and fifth diodes D4 and D5 are turned on so that the output voltage of the second circuit unit is uniformly maintained.

Accordingly, the second circuit unit can serve as a rectifier having a uniform output voltage throughout both the first and second periods d1 and d2.

As described above, a current can be generated by the second and third capacitors C2 and C3 during both the first and second periods d1 and d2. Accordingly, the DC-to-DC converter 110 can serve as an interleaver, and thus, the current efficiency of the DC-to-DC converter 110 can be improved.

Also, since capacitors that resonate in response to leakage inductance without a requirement of an additional inductor for LC resonance are provided, the efficiency of the DC-to-DC converter 110 can be improved.

Figure 3:
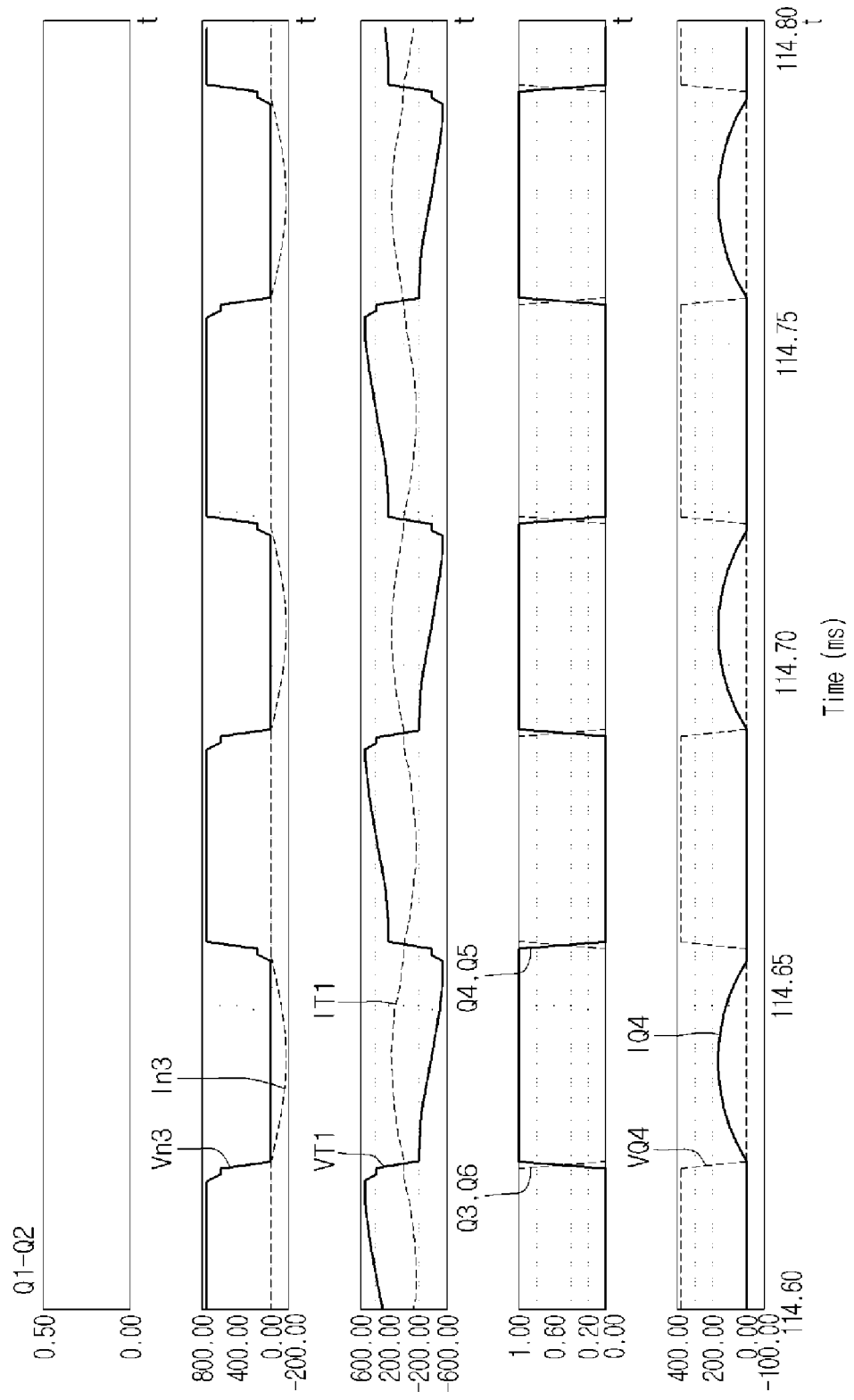
FIG. 3 is a waveform diagram illustrating an operation of the power supply device in a power mode.

FIG. 3 is a waveform diagram illustrating an operation of the DC-to-DC converter 110 in a power mode.

Referring to FIG. 3, in response to an input DC voltage being applied between the fifth and sixth nodes n5 and n6 of the second circuit unit, the first circuit unit outputs a higher voltage than the input DC voltage so that the DC-to-DC converter 110 operates in the power mode.

More specifically, the controller 120 turns off the first and second switches Q1 and Q2.

The controller 120 alternately turns on the third to sixth switches Q3 to Q6 of the full bridge circuit of the second circuit unit.

That is, the controller 120 turns on the third and sixth switches Q3 and Q6 during the first period d1, and turns on the fourth and fifth switches Q4 and Q5 during the second period d2.

The first and second periods d1 and d2 may have the same duty cycle of ½.

The switching frequency for the third to sixth switches Q3 to Q6 may be the same as the resonant frequency of the first and second capacitors C1 and C2.

During the power mode, in response to the third and sixth switches Q3 and Q6 being turned on, the input DC voltage is distributed between the third and sixth switches Q3 and Q6 and the second winding. Due to the voltage distributed to the second winding and a current flowing through the second winding, an induced current flows into the first winding.

Due to the induced current, a positive voltage is applied to the third node n3, and the first diode D1 is turned on so that an output DC voltage is applied between the first and second nodes n1 and n2.

During the second period d2, in response to the fourth and fifth switches Q4 and Q5 being turned on, an inverse current and an inverse voltage are applied to the second winding. As a result, a resonant current that flows through the first winding of the transformer T has a sine wave, and a resonant voltage at the first winding (OK?) alternately becomes positive or negative every half a cycle.

The energy of the resonant current is stored in the third capacitor C3 during the first period d1, and is then stored in the fourth capacitor C4 during the second period d2. Accordingly, it is possible to inhibit ripple from being caused by a switching operation during the first and second periods d1 and d2.

As described above, a current can be generated by the third and fourth capacitors C3 and C4 during both the first and second periods d1 and d2. Accordingly, the DC-to-DC converter 110 can serve as an interleaver, and thus, the current efficiency of the DC-to-DC converter 110 can be improved.

Also, since capacitors that resonate in response to leakage inductance without a requirement of an additional inductor for LC resonance are provided, the efficiency of the DC-to-DC converter 110 can be improved.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A power supply device comprising:
a half bridge circuit configured to include a first switch connected to a first node and a third node, a second switch connected to a second node and the third node, a first capacitor connected to the first node and a fourth node, and a second capacitor connected to the second node and the fourth node;
a full bridge circuit configured to include a third switch connected to a fifth node and a seventh node, a fourth switch connected to a sixth node and the seventh node, a fifth switch connected to the fifth node and an eighth node, and a sixth switch connected to the sixth node and the eighth node;
a transformer configured to include a first winding connected to the third node and the fourth node, and a second winding connected to the seventh node and the eighth node;
first to sixth diodes configured to be connected to the first to sixth switches, respectively;
wherein during a load mode, a turn-off state of the third to sixth switches is maintained when a first input voltage between the first node and the second node is converted to a first output voltage between the fifth node and the sixth node; and
wherein during a power mode, a turn-off state of the first and second switches is maintained when a second input voltage between the fifth node and the sixth node is converted to a second output voltage between the first node and the second node.

2. The power supply device of claim 1, wherein the first and second switches are alternately driven.

3. The power supply device of claim 2, wherein the first and second switches are driven at a duty cycle of ½.

4. The power supply device of claim 2, wherein a switching frequency for the first and second switches is the same as a leakage inductance of the transformer and a resonant frequency of the first and second capacitors.

5. The power supply device of claim 1, wherein the first to sixth diodes of the first to sixth switches are connected to one another in a backward direction.

6. The power supply device of claim 1, wherein the first to sixth switches are transistors.

7. The power supply device of claim 1, wherein the first and second capacitors have a same capacitance.

8. The power supply device of claim 1, further comprising:
a controller configured to drive the first to sixth switches.

9. The power supply device of claim 1, further comprising:
a first output capacitor configured to be disposed between the first and second nodes; and
a second output capacitor configured to be disposed between the fifth and sixth nodes.

* * * * *